United States Patent
Reichert

[11] Patent Number: 5,831,038
[45] Date of Patent: Nov. 3, 1998

[54] DIG 20 HALOGENOTRIAZINYL GROUP-CONTAINING FIBER REACTIVE DYES, THEIR PREPARATION AND THEIR USE

[75] Inventor: Hans Reichert, Rheinfelden, Germany

[73] Assignee: Ciba Specialty Chemicals Corporation, Tarrytown, N.Y.

[21] Appl. No.: 744,167

[22] Filed: Nov. 12, 1996

[30] Foreign Application Priority Data

Nov. 16, 1995 [CH] Switzerland ............. 03254/95

[51] Int. Cl.⁶ .............. C09B 62/513; C09B 62/09; D06P 1/38
[52] U.S. Cl. ................................. 534/612; 534/634
[58] Field of Search ............................. 534/634, 612

[56] References Cited

U.S. PATENT DOCUMENTS

| | | | |
|---|---|---|---|
| 4,323,497 | 4/1982 | Hoyer et al. | 534/634 |
| 5,200,511 | 4/1993 | Loeffler et al. | 534/634 |
| 5,232,462 | 8/1993 | Tzikas | 8/549 |
| 5,451,665 | 9/1995 | Tzikas | 534/618 |
| 5,552,532 | 9/1996 | Klier et al. | 534/612 |

FOREIGN PATENT DOCUMENTS

| | | |
|---|---|---|
| 0478503 | 4/1992 | European Pat. Off. |
| 0511523 | 11/1992 | European Pat. Off. |
| 0625549 | 11/1994 | European Pat. Off. |
| 2008144 | 5/1979 | United Kingdom |

*Primary Examiner*—Fiona T. Powers
*Attorney, Agent, or Firm*—David R. Crichton

[57] ABSTRACT

Compounds of the formula

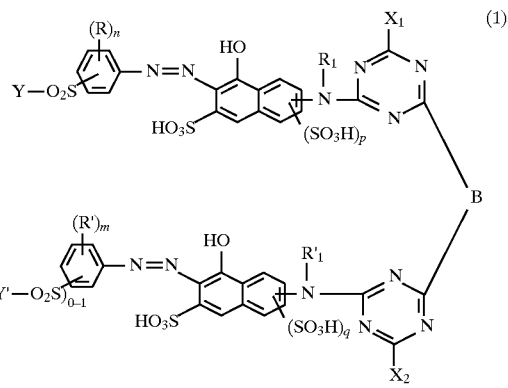

in which the variables are as defined in the claims, which are suitable as fibre-reactive dyes for dyeing or printing widely varying fibre materials are described.

14 Claims, No Drawings

DIG 20 HALOGENOTRIAZINYL GROUP-CONTAINING FIBER REACTIVE DYES, THEIR PREPARATION AND THEIR USE

The present invention relates to novel reactive dyes, processes for their preparation and their use for dyeing or printing textile fibre materials.

The practice of dyeing using reactive dyes has recently led to increased demands on the quality of the dyeings and the profitability of the dyeing process. Consequently, there is still a need for novel reactive dyes which have improved properties, in particular in respect of application.

Reactive dyes which have an adequate substantivity and at the same time show a good ease of washing off of the unfixed portions are now required for dyeing. They should furthermore show a good dyeing yield and have a high reactivity, and in particular dyeings should be produced with high degrees of fixing. The known dyes do not meet these requirements in all their properties.

The present invention is therefore based on the object of discovering novel, improved reactive dyes for dyeing and printing fibre materials which have the qualities characterized above to a high degree. In particular, the novel dyes should be distinguished by high fixing yields and high fibre-dye bond stabilities, and furthermore the portions not fixed on the fibre should be easy to wash off. They should furthermore produce dyeings with good all-round properties, for example light and wet fastness properties.

It has been found that the object described is largely achieved with the novel reactive dyes defined below.

The present invention therefore relates to compounds of the formula

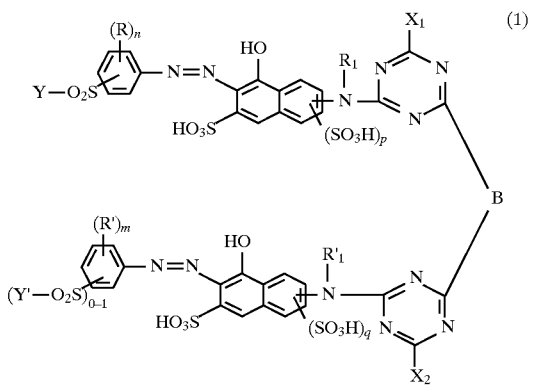

in which B is a bridge member of the formula

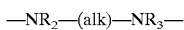 (2a)

or

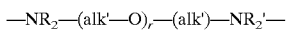 (2b)

or

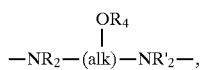 (2c)

$(R)_n$ is n identical or different radicals from the group consisting of $C_1$–$C_4$alkyl, $C_1$–$C_4$alkoxy, halogen and sulfo and $(R')_m$ is m identical or different radicals from the group consisting of $C_1$–$C_4$alkyl, $C_1$–$C_4$alkoxy, halogen and sulfo, n and m independently of one another are each the number 0, 1 or 2, $R_1$, $R_1'$, $R_2$ and $R_2'$ independently of one another are each hydrogen or substituted or unsubstituted $C_1$–$C_4$alkyl, $R_3$ is $C_1$–$C_6$alkyl which is substituted by hydroxyl, $R_4$ is hydrogen or $C_1$–$C_4$alkyl, (alk) is straight-chain or branched $C_2$–$C_{12}$alkylene and (alk') is straight-chain or branched $C_2$–$C_4$alkylene, $X_1$ and $X_2$ independently of one another are each halogen, 3-carboxypyridin-1-yl or 3-carbamoylpyridin-1-yl, Y and Y' independently of one another are each vinyl or a radical —$CH_2$—$CH_2$—U and U is a leaving group, and p and q independently of one another are each the number 0 or 1 and r is the number 1, 2 or 3.

The compounds of the formula (1) contain at least two, preferably 2 to 8, sulfo groups, each of which is present either in the form of its free acid or, preferably, as a salt thereof. Salts are, for example, the alkali metal, alkaline earth metal or ammonium salts, salts of an organic amine or mixtures thereof. Examples are sodium, lithium, potassium or ammonium salts, the salt of mono-, di- or triethanolamine or Na/Li or Na/Li/$NH_4$ mixed salts.

Examples of suitable radicals (alk) are straight-chain or branched ethylene, propylene, butylene, pentylene, hexylene, heptylene, octylene, nonylene, decylene, undecylene or dodecylene. The bivalent radical (alk) is preferably straight-chain or branched $C_2$–$C_6$alkylene, particularly preferably straight-chain or branched $C_2$–$C_4$alkylene, and especially preferably 1,2-ethylene or 1,3-propylene.

The bivalent radical (alk') is preferably 1,2-propylene or, in particular, 1,2-ethylene.

r is preferably the number 2 or 3, and particularly preferably the number 2. p and q are preferably each the number 1.

Substituted or unsubstituted $C_1$–$C_4$alkyl $R_1$, $R_1'$, $R_2$ or $R_2'$ can be, for example, methyl, ethyl, n- or iso-propyl or n-, sec-, tert- or iso-butyl which are unsubstituted or substituted, for example by hydroxyl, sulfo, sulfato, carboxyl, cyano, halogen, $C_1$–$C_4$alkoxycarbonyl or carbamoyl.

$R_1$, $R_1'$, $R_2$ and $R_2'$ independently of one another are each preferably hydrogen or $C_1$–$C_4$alkyl, particularly preferably hydrogen, methyl or ethyl, and especially preferably hydrogen.

$R_3$ is, for example, methyl, ethyl, n- or iso-propyl, n-, iso-, sec- or tert-butyl or straight-chain or branched pentyl or hexyl which carries 1 to 3 hydroxyl groups, preferably 1 hydroxyl group. $R_3$ is preferably a monohydroxy-substituted $C_1$–$C_4$alkyl radical, and particularly preferably a monohydroxy-substituted ethyl or propyl radical. $R_3$ is especially preferably the β-hydroxyethyl radical.

$R_4$ is preferably hydrogen, methyl or ethyl, and particularly preferably hydrogen.

Preferred bridge members B are those radicals of the formulae (2a), (2b) and (2c) defined above in which
(alk) is straight-chain or branched $C_2$–$C_6$alkylene,
(alk') is 1,2-ethylene,
r is the number 2 or 3,
$R_2$ and $R_2'$ are each hydrogen,
$R_3$ is monohydroxy-substituted $C_1$–$C_4$alkyl and
$R_4$ is hydrogen.

B is particularly preferably a radical of the formula (2a) in which $R_2$, $R_3$ and (alk) are each as defined and preferred above. B is particularly preferably the radical —NH—$CH_2$—$CH_2$—N($CH_2CH_2$—OH)—.

$X_1$ and $X_2$ independently of one another are each preferably fluorine or chlorine. $X_1$ and $X_2$ can be different or, preferably, identical. $X_1$ and $X_2$ are particularly preferably each chlorine.

R and R' independently of one another are each preferably methyl, methoxy, chlorine or sulfo, and particularly preferably sulfo, methyl or methoxy.

n and m independently of one another are each preferably the number 0 or 1, and particularly preferably each the number 0.

$(R)_n$ and $(R')_m$ independently of one another are each preferably 0, 1 or 2 identical or different radicals from the group consisting of methyl, methoxy and sulfo, and particularly preferably 0 or 1 radical from the group consisting of methyl, methoxy and sulfo.

The radicals $(R)_n$ and $(R')_m$ can be different or identical and are preferably identical.

In a radical —$CH_2$—$CH_2$—U Y or Y', the leaving group U can be, for example, —Cl, —Br, —F, —$OSO_3H$, —$SSO_3H$, —OCO—$CH_3$, —$OPO_3H_2$, —OCO—$C_6H_5$, —$OSO_2$—$C_1$–$C_4$alkyl or —$OSO_2$—$N(C_1$–$C_4$alkyl$)_2$. U is preferably a group of the formula —Cl, —$OSO_3H$, —$SSO_3H$, —OCO—$CH_3$, —OCO—$C_6H_5$ or —$OPO_3H_2$, in particular —Cl or —$OSO_3H$, and particularly preferably —$OSO_3H$.

Y and Y' independently of one another are each preferably vinyl, β-chloroethyl, β-sulfatoethyl, β-thiosulfatoethyl, β-acetoxyethyl, β-phenoxyethyl or β-phosphatoethyl, and particularly preferably β-sulfatoethyl or vinyl. The radicals Y and Y' can be different or identical and are preferably identical.

The dyes of the formula (1) preferably contain a radical of the formula —$SO_2$—Y'.

A preferred group of compounds according to the invention has the formula

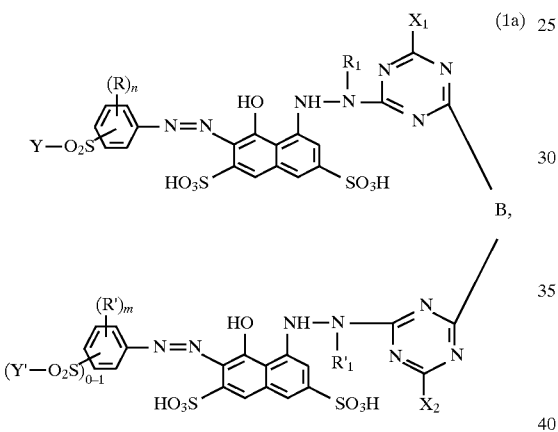

in particular the formula

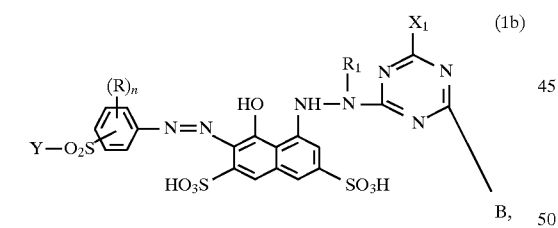

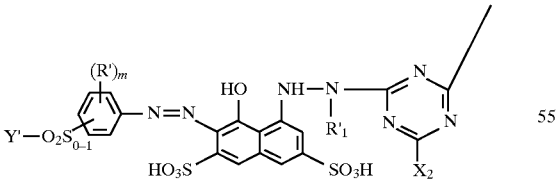

in which, in the formulae (1a) and (1b), B, $X_1$, $X_2$, Y, $(R)_n$ and $(R')_m$ are each as defined and preferred above.

A particularly preferred group of compounds according to the invention has the formula (1a), in particular the formula (1b), in which $X_1$ and $X_2$ are each chlorine,
$R_1$ and $R_1'$ are each hydrogen,
$(R)_n$ and $(R')_m$ are identical and are each 0, 1 or 2 identical or different radicals from the group consisting of methyl, methoxy and sulfo, Y and Y' are identical and are each β-sulfatoethyl or vinyl and B is a bridge member of the formula $$-NR_2-(alk)-NR_3- \quad (2a)$$

in which $R_2$ is hydrogen, $R_3$ is monohydroxy-substituted $C_1$–$C_4$alkyl and (alk) is straight-chain or branched $C_2$–$C_4$alkylene.

The present invention furthermore relates to a process for the preparation of the compounds of the formula (1) or (1a), which comprises reacting in each case about 1 molar equivalent of a compound of the formula

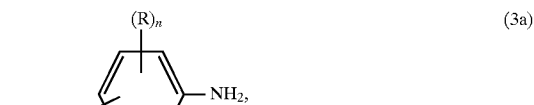

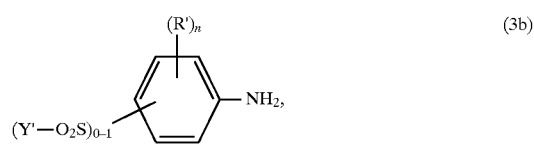

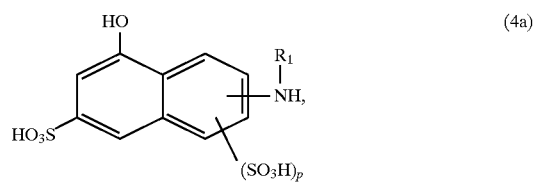

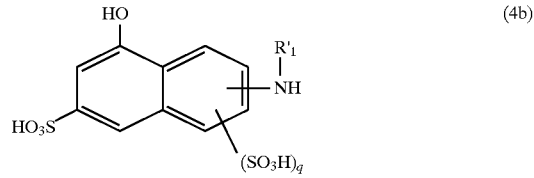

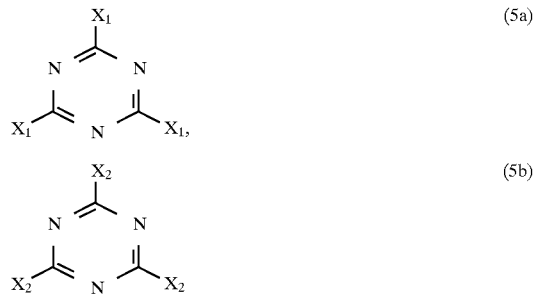

and $$H-B-H \quad (6),$$

in which B, $(R)_n$, $(R')_m$, $R_1$, $R_1'$, $X_1$, $X_2$, Y, p and q are each as defined above, with one another in any sequence.

The diazotization of the compounds of the formulae (3a) and (3b) and their coupling with the compounds of the formulae (4a) and (4b) or a reaction product of the compounds of the formulae (4a) and (5a) or (4b) and (5b) and, if appropriate, (6) are carried out in the customary manner, for example by diazotizing the compound of the formula (3a) or (3b) in mineral acid solution, for example hydrochloric acid solution, with a nitrite, for example sodium nitrite, at a low temperature, for example at 0° to 5° C., and then carrying out the coupling with the corresponding coupling component at a neutral to slightly acidic pH, for example at pH 3 to 7, and preferably 5 to 6.5, and low temperatures, for example 0° to 30° C.

The condensation reactions between the compounds of the formulae (4a), (4b), (5a), (5b) and (6) are in general carried out analogously to known processes, as a rule in aqueous solution at temperatures of, for example, 0° to 50° C. and a pH of, for example, 4 to 10.

The process for the preparation of the preferred symmetric compounds of the formula (1) comprises first subjecting about 1 molar equivalent of the compound of the formula (4a) to a condensation reaction with about 1 molar equivalent of the compound of the formula (5a), coupling the resulting product with about 1 molar equivalent of the previously diazotized compound of the formula (3a), and subjecting the resulting monoazotriazinyl compound to a condensation reaction with about 0.5 molar equivalent of a compound of the formula (6).

The most important process variants are described in the examples.

The compounds of the formulae (3a), (3b), (4a), (4b), (5a), (5b) and (6) are known or can be prepared analogously to known compounds.

The dyes according to the invention are fibre-reactive. Fibre-reactive compounds are to be understood as those which are capable of reacting with the hydroxyl groups of cellulose, the amino, carboxyl, hydroxyl or thiol groups of wool and silk, or with the amino and, where appropriate, with the carboxyl groups of synthetic polyamides to form covalent chemical bonds.

The dyes according to the invention are suitable for dyeing and printing widely varying materials, such as fibre materials containing hydroxyl groups or containing nitrogen. Examples are silk, leather, wool, polyamide fibres and polyurethanes, and in particular all types of cellulosic fibre materials. Such cellulosic fibre materials are, for example, the natural cellulosic fibres, such as cotton, linen and hemp, as well as cellulose and regenerated cellulose. The dyes according to the invention are also suitable for dyeing or printing fibres containing hydroxyl groups which are contained in blend fabrics, for example mixtures of cotton with polyester fibres or polyamide fibres. The dye mixtures according to the invention and the dyes according to the invention are particularly suitable for dyeing or printing cellulosic materials. They can furthermore be used for dyeing or printing natural or synthetic polyamide fibre materials.

The dyes according to the invention can be applied to the fibre material and fixed on the fibre in various ways, in particular in the form of aqueous dye solutions and printing pastes. They are suitable both for the exhaust method and for dyeing by the pad-dyeing method, in which the goods are impregnated with aqueous dye solutions, which may contain salts, and, after treatment with alkali or in the presence of alkali, the dyes are fixed, if appropriate under the action of heat or by storage at room temperature for several hours. After the fixing, the dyeings or prints are rinsed thoroughly with cold and hot water, if appropriate with the addition of an agent which has a dispersing action and promotes diffusion of the unfixed portions.

The dyes according to the invention are distinguished by a high reactivity, good fixing capacity and very good build-up capacity. They can therefore be employed by the exhaust dyeing method at low dyeing temperatures and require only short steaming times in the pad-steam method. The degrees of fixing are high and the unfixed portions can easily be washed off, the difference between the degree of exhaustion and degree of fixing being remarkably small, i.e. the soaping loss being very low. The dyes according to the invention and, in particular, the dye mixtures according to the invention are also particularly suitable for printing, in particular on cotton, but also for printing nitrogen-containing fibres, for example wool or silk, or blend fabrics which comprise wool or silk.

The dyeings and prints produced with the dyes according to the invention have a high colour strength and a high fibre-dye bond stability both in the acidic and in the alkaline range, and furthermore a good fastness to light and very good wet fastness properties, such as fastness to washing, water, seawater, crossdyeing and perspiration, as well as a good fastness to pleating, fastness to ironing and fastness to rubbing.

The following examples serve to illustrate the invention. Temperatures are stated in degrees Celsius, parts are parts by weight and the percentage data are based on percentages by weight, unless noted otherwise. Parts by weight bear the same relation to parts by volume as the kilogram to the liter.

EXAMPLE 1

Preparation of the compound of the formula

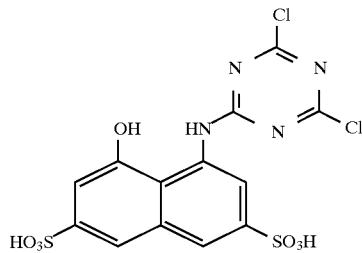

19 parts of cyanuric chloride and 5 parts of disodium hydrogen phosphate are thoroughly mixed vigorously in 50 parts of ice/water, with the addition of a wetting agent, at a temperature of 0° C. for 15 minutes. A neutral solution of 32 parts of 1-amino-8-naphthol-3,6-disulfonic acid in 300 parts of water is added dropwise such that the reaction mixture does not exceed a pH of 3. When the addition has ended, the mixture is kept at pH 3 and 0° C. for a further two hours with sodium hydroxide solution.

EXAMPLE 2

Diazotization of 2-(4-aminophenylsulfonyl)ethyl hydrogen sulfate. 28 parts of 2-(4-aminophenylsulfonyl)ethyl hydrogen sulfate are suspended in 300 parts of water and dissolved at pH 6 with saturated sodium carbonate solution, the solution is cooled to 0° C., 7 parts of sodium nitrite, 50 parts of ice and 30 parts of concentrated hydrochloric acid are added and diazotization is carried out for 2 hours. Thereafter, excess nitrite is destroyed with a little sulfamic acid.

EXAMPLE 3

Preparation of the compound of the formula

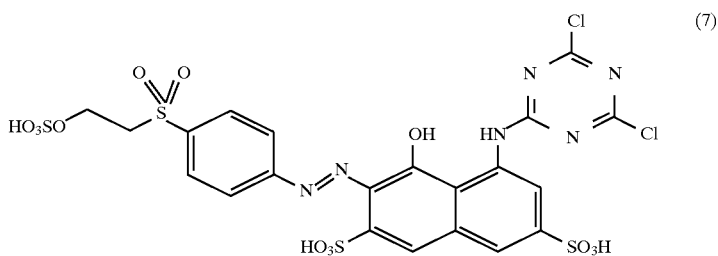

(7)

The reaction mixture prepared according to Example 2 is added to the reaction mixture prepared according to Example 1 in the course of about 30 minutes, and the pH is raised to 4.5 in the course of 3 hours with saturated sodium acetate solution and the temperature is kept between 0° and 5° C.

EXAMPLE 4

Diazotization of 2-(4-amino-3,6-dimethoxyphenylsulfonyl)ethyl hydrogen sulfate. The procedure described in Example 2 is followed, except that an equivalent amount of 2-(4-amino-3,6-dimethoxyphenylsulfonyl)ethyl hydrogen sulfate is used instead of the 28 parts of 2-(4-aminophenylsulfonyl)ethyl hydrogen sulfate.

EXAMPLE 5

Preparation of the compound of the formula

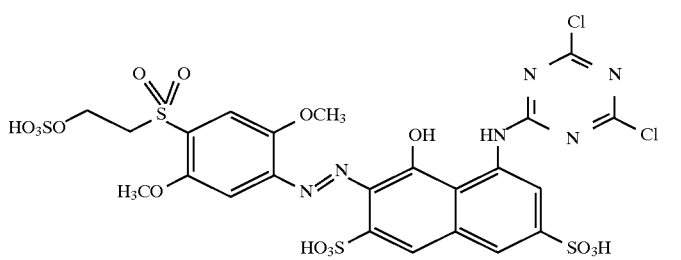

(8)

The reaction mixture prepared according to Example 4 is added to the reaction mixture prepared according to Example 1 in the course of about 30 minutes, and the pH is raised to 4.5 in the course of 3 hours with saturated sodium acetate solution and the temperature is kept between 0° and 5° C.

EXAMPLE 6

5 parts of N-(2-hydroxyethyl)ethylenediamine in 50 parts of water are added to the reaction mixture obtained according to Example 3 and comprising the compound of the formula (7) such that the pH does not rise above 8.5. When the addition has ended, the mixture is heated to a temperature of 25° to 30° C. and the pH is kept at 8.5 for two hours with sodium hydroxide solution. Subsequent neutralization with dilute hydrochloric acid, reverse osmosis and evaporation in vacuo lead to the compound of the formula

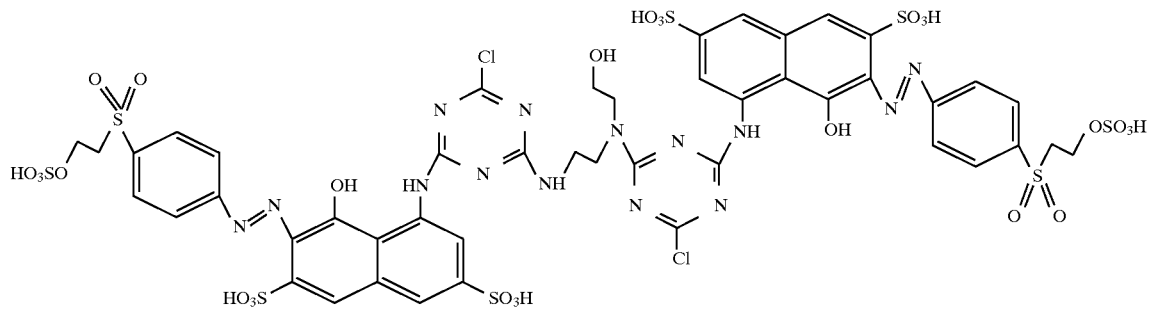

which dyes cotton in a red shade with good all-round properties.

EXAMPLE 6a 5 parts of N-(2-hydroxyethyl)ethylenediamine in 50 parts of water are added to the reaction mixture obtained according to Example 3 and comprising the compound of the formula (7) such that the pH does not rise above 8.5. When the addition has ended, the mixture is heated to a temperature of 25° to 30° C. and the pH is kept at 8.5 for two hours and at 11 for 20 minutes with sodium hydroxide solution. Subsequent neutralization, reverse osmosis and evaporation in vacuo lead to the compound of the formula

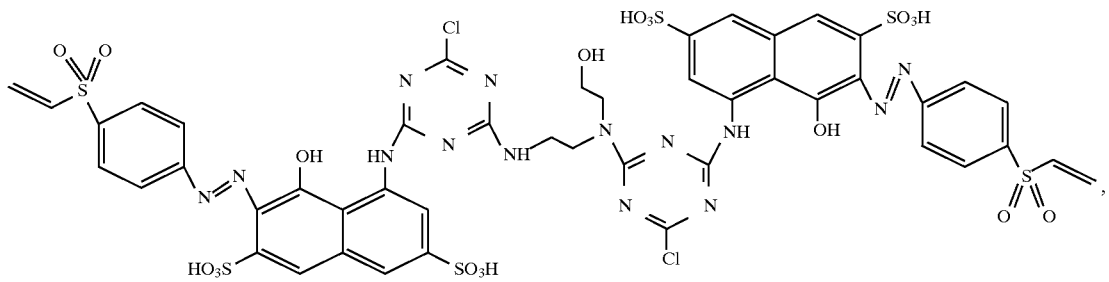

which dyes cotton in a red shade with good all-round properties.

EXAMPLE 7

The procedure described in Example 6 is followed, except that an equivalent amount of 2-hydroxy-1,3-diaminopropane is used instead of N-(2-hydroxyethyl)ethylenediamine, affording a dye of the formula

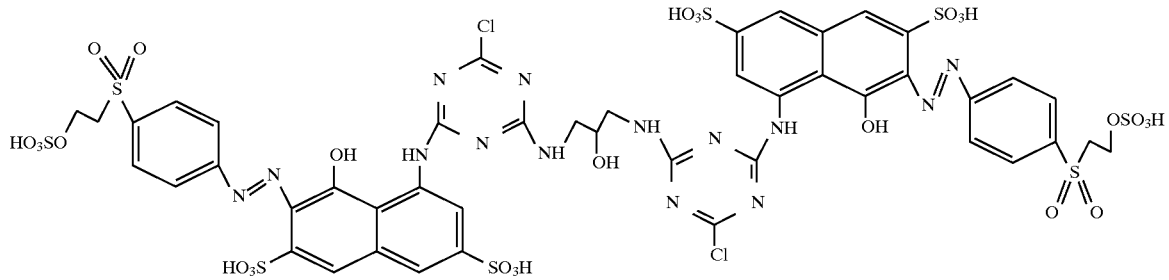

which dyes cellulose in a red shade with good all-round properties.

EXAMPLE 8

The procedure described in Example 6 is followed, except that an equivalent amount of N-(2-hydroxyethyl)propylenediamine is used instead of N-(2-hydroxyethyl)ethylenediamine, affording a dye of the formula

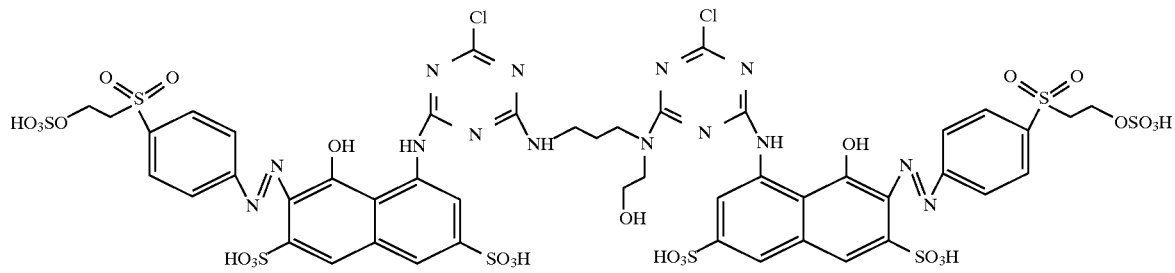

which dyes cellulose in a red shade with good all-round properties.

EXAMPLE 9

The procedure described in Example 6 is followed, except that an equivalent amount of 1,8-diamino-3,6-dioxaoctane is used instead of N-(2-hydroxyethyl)ethylenediamine, affording the dye of the formula

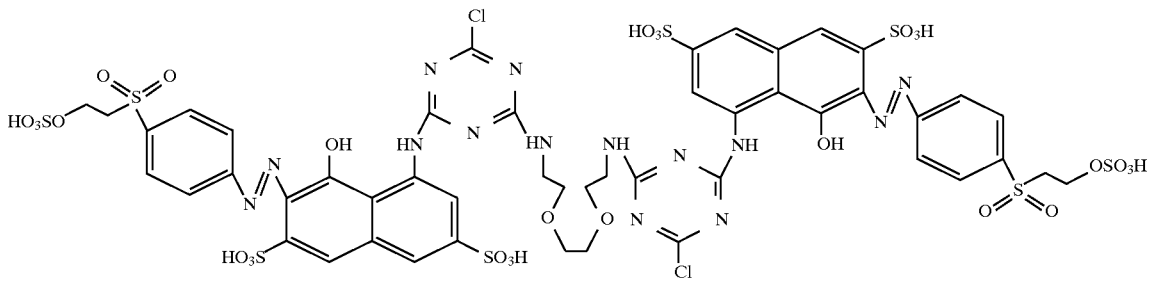

which dyes cellulose in a red shade with good all-round properties.

EXAMPLE 10

5 parts of N-hydroxyethylethylenediamine in 50 parts of water are added to the reaction mixture prepared according to Example 5 and comprising the compound of the formula (8) such that the pH does not rise above 8.5. When the addition has ended, the mixture is heated to a temperature of 25° to 30° C. and the pH is kept at 8.5 for 2 hours and at 11 for 20 minutes with sodium hydroxide solution. The pH is then brought to 7 with dilute hydrochloric acid; subsequent reverse osmosis and evaporation in vacuo lead to the compound of the formula

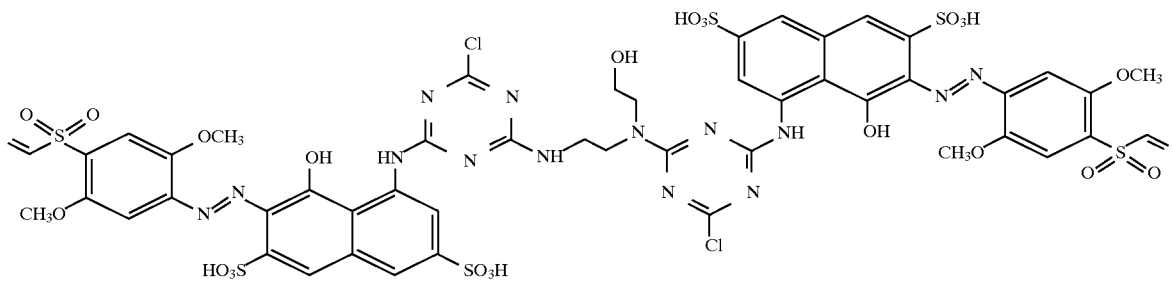

which dyes cellulose in a red shade with good all-round properties.

EXAMPLES 11–17

The following compounds, each of which dyes cotton with good all-round properties, can be prepared in a manner analogous to that described in Examples 6 and 10.

11
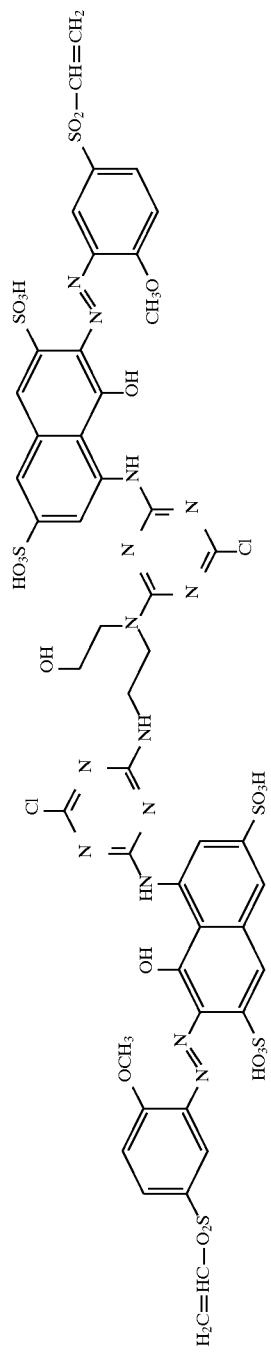
12
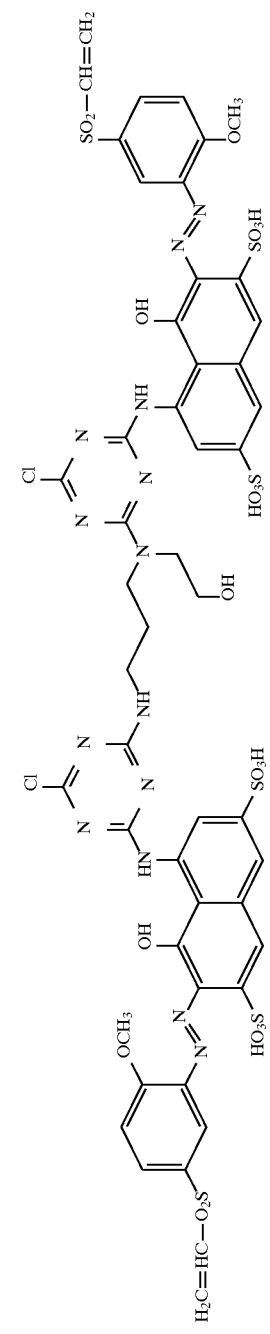
13
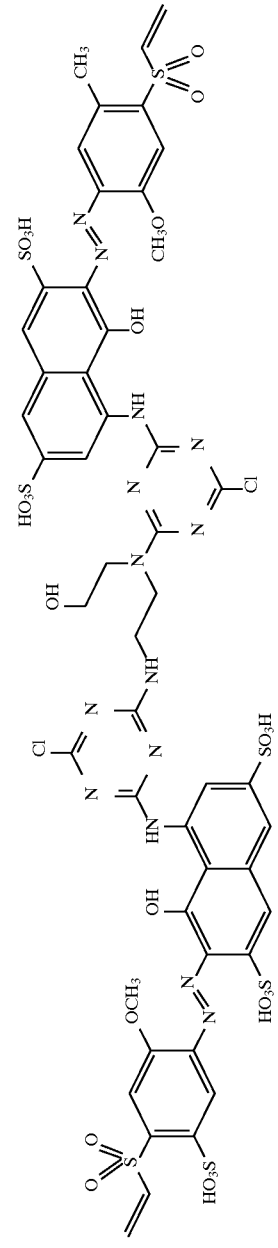
14
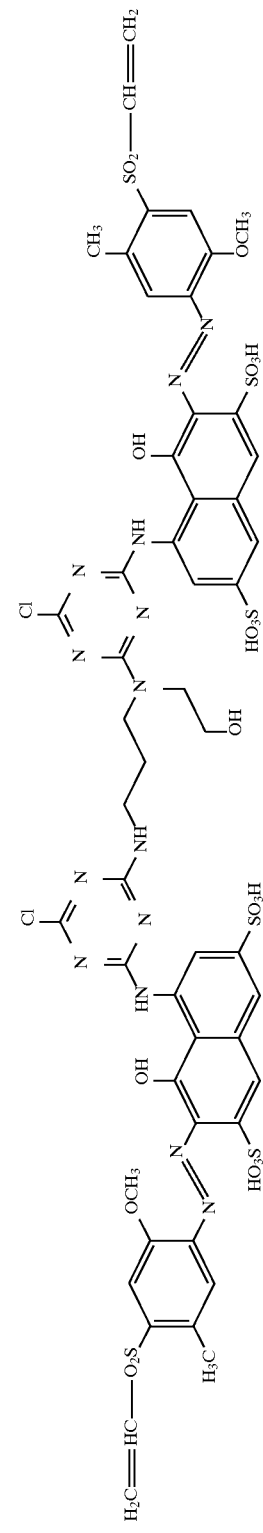

-continued
15
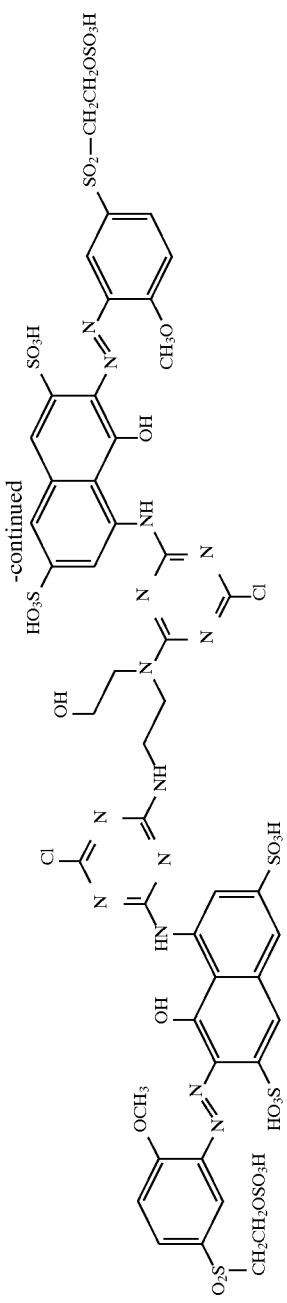
16
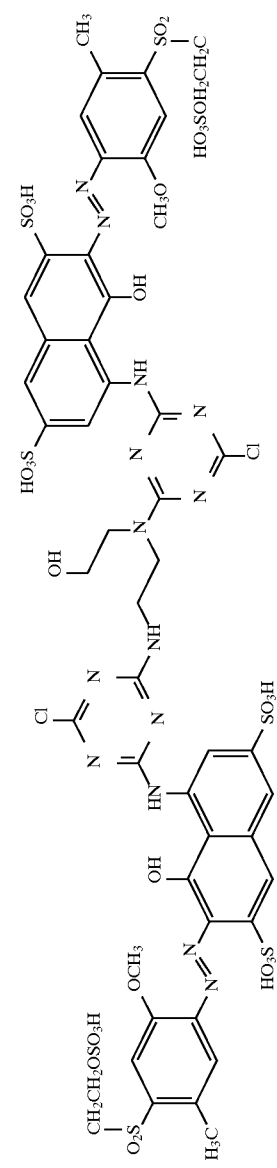
17
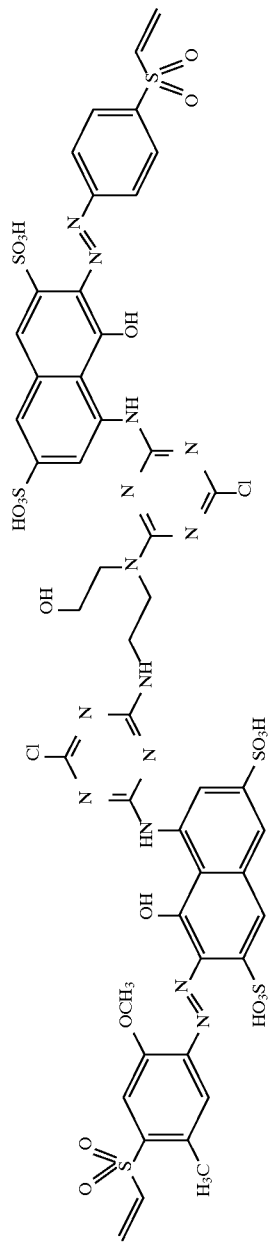

EXAMPLE 18

A neutralized solution of 42 parts of N-(2-hydroxyethyl)ethylenediamine in 200 parts of water is added to the reaction mixture prepared according to Example 3, while cooling with ice, such that the pH does not exceed 5.5. The pH is kept constant at 5.5 with dilute aqueous sodium hydroxide solution until the reaction has ended. The condensation product is precipitated by addition of potassium chloride. The precipitate, which comprises the compound of the following formula

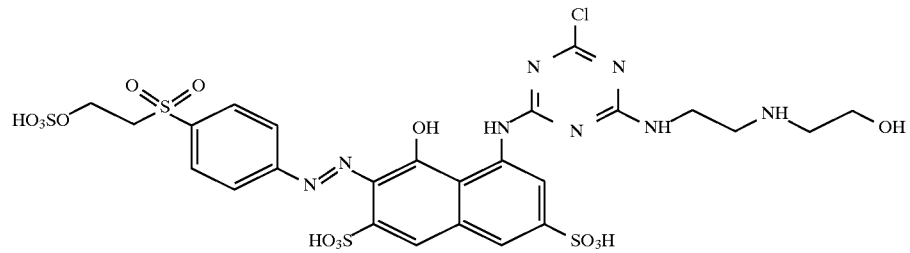

as the main component, is filtered off, washed with saturated potassium chloride solution and dried in vacuo at 40° C.

EXAMPLE 19

The procedure described in Example 18 is followed, except that an equimolar amount of 2-hydroxy-1,3-diaminopropane is used instead of 42 parts of N-(2-hydroxyethyl)ethylenediamine, affording the compound of the formula

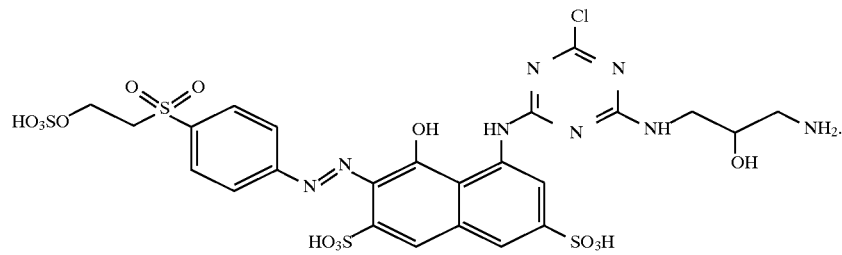

EXAMPLE 20

The procedure described in Example 18 is followed, except that an equimolar amount of N-(2-hydroxyethyl)propylenediamine is used instead of 42 parts of N-(2-hydroxyethyl)ethylenediamine, affording the compound of the formula

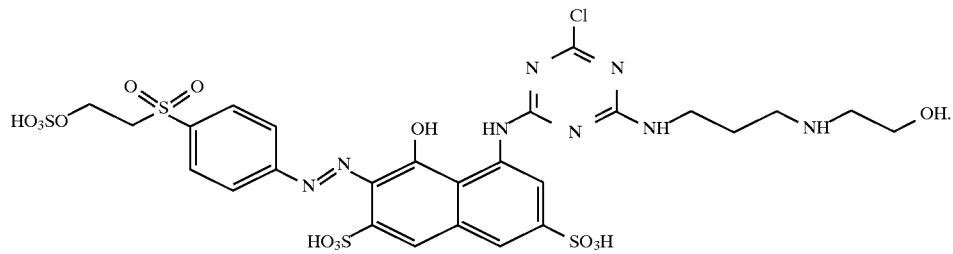

EXAMPLE 21

83 parts of the compound from Example 18 are added to a reaction mixture prepared as described in Example 5 and a condensation reaction is carried out at room temperature and a pH of 8.5 to give the dye of the following formula

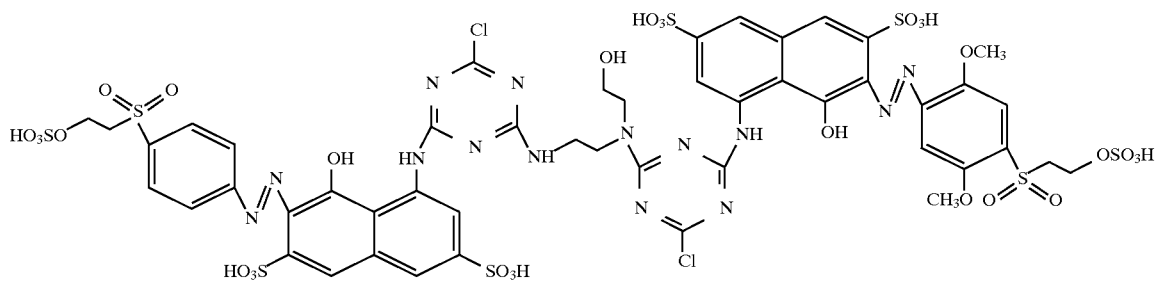

which, after neutralization, reverse osmosis and evaporation in vacuo, is obtained as a red-brown powder.

EXAMPLES 22 to 26

81 parts of the compound from Example 19 are used and the condensation reaction with the reaction mixture from Example 5 is carried out in the same manner as described in Example 21. The dye of the formula

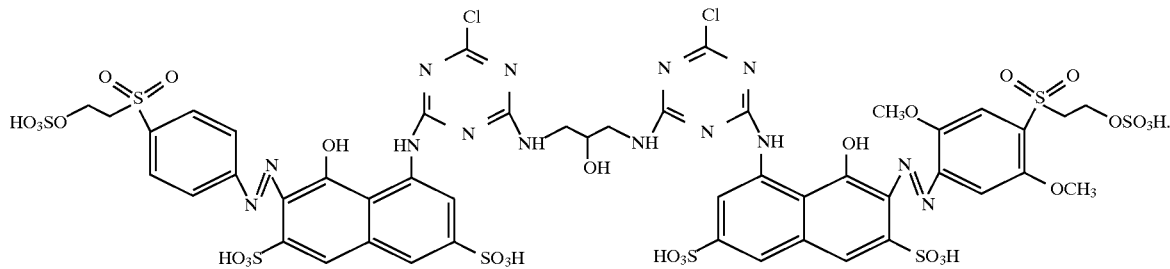

is thus obtained.

84 parts of the compound from Example 20 are used and the condensation reaction with the reaction mixture from Example 5 is carried out in the same manner as described in Example 21. The dye of the formula

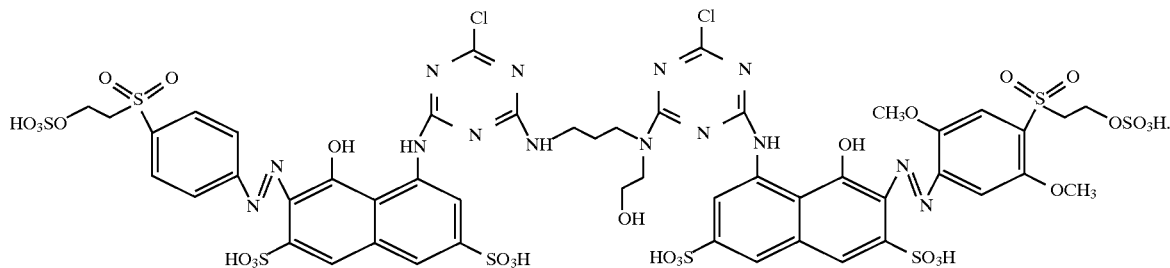

is thus obtained.

The dyes of the formulae

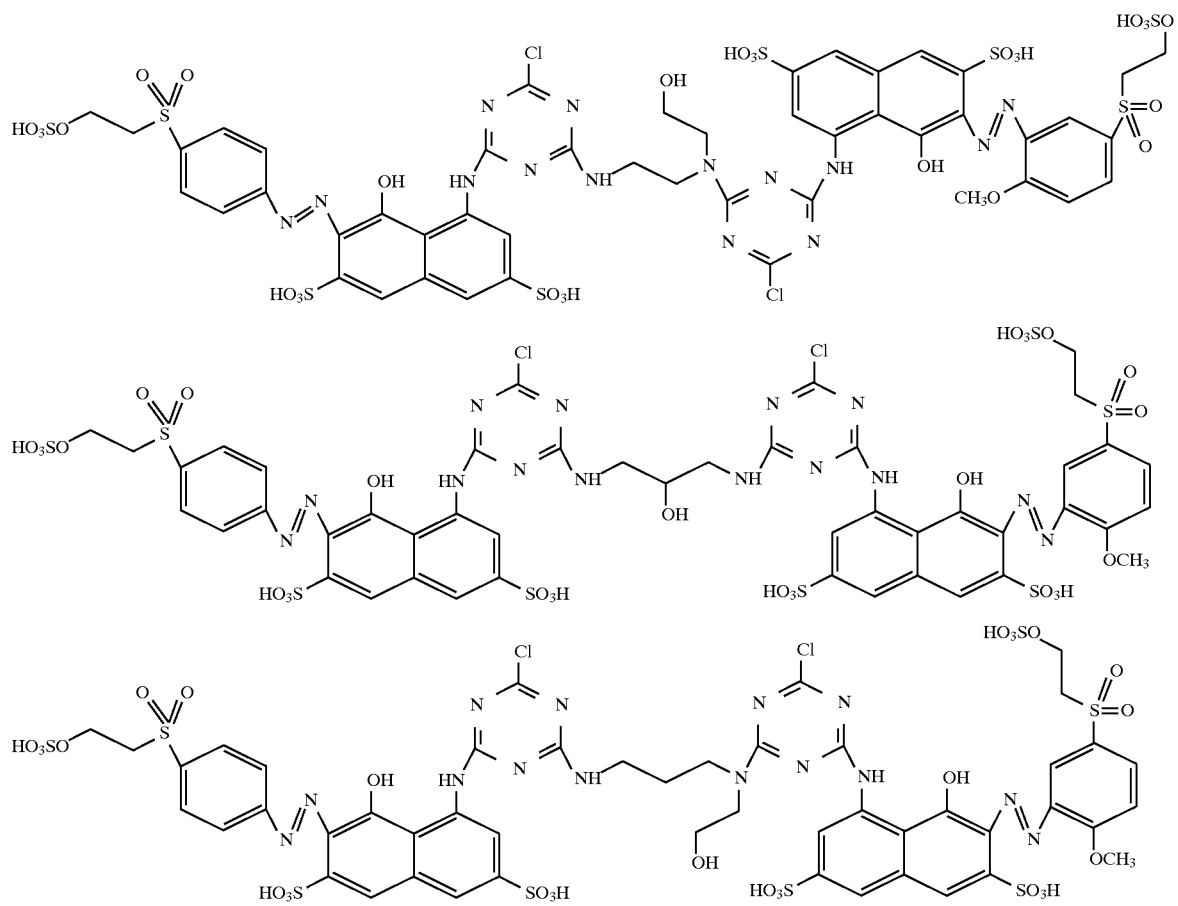

can be obtained in an analogous manner.

EXAMPLE 27

14 parts of cyanuric fluoride are added dropwise at a temperature of 0° to 2° C. to a neutral solution of 50 parts of 7-amino-4-hydroxy-3-(4-methoxy-2-sulfophenylazo) naphthalene-2-sulfonic acid and 5 parts of disodium hydrogen phosphate in 500 parts of water. The pH is kept constant here at 5.5 by addition of aqueous sodium hydroxide solution. When the reaction has ended, a suspension of 83 parts of the compound prepared in Example 18 in 400 parts of water is added to this reaction mixture and the pH is raised to and kept at 8.5 with sodium hydroxide solution. When the condensation has ended, the temperature is increased to 30° C. and the pH is raised to 11 and kept at 11 for 20 minutes by addition of sodium hydroxide solution. The reaction mixture is neutralized, largely desalinated by reverse osmosis and concentrated in vacuo. The dye of the formula

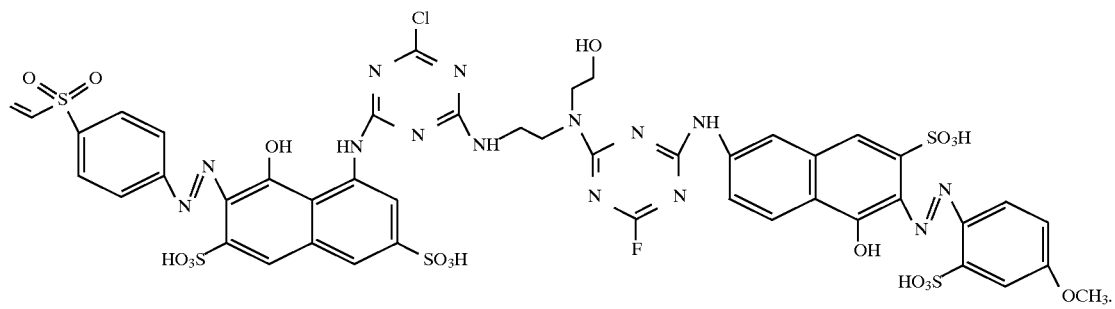

is obtained.

Dyeing Instructions I 2 parts of the dye obtained according to Example 6 are dissolved in 400 parts of water; 1500 parts of a solution which comprises 53 g of sodium chloride per liter are added. 100 parts of cotton fabric are introduced into this dyebath at 40° C. After 45 minutes, 100 parts of a solution which comprises 16 g of sodium hydroxide and 20 g of calcined sodium carbonate per liter are added. The temperature of the dyebath is kept at 40° C. for a further 45 minutes. Thereafter, the dyed goods are rinsed, soaped at the boil for a quarter of an hour with a nonionic detergent, rinsed again and dried.

Dyeing Instructions II 2 parts of the reactive dye obtained according to Example 10 are dissolved in 400 parts of water; 1500 parts of a solution which comprises 53 g of sodium chloride per liter are added. 100 parts of a cotton fabric are introduced into this dyebath at 35° C. After 20 minutes, 100 parts of a solution which comprises 16 g of sodium hydroxide and 20 g of calcined sodium carbonate per liter are added. The temperature of the dyebath is kept at 35° C. for a further 15 minutes. Thereafter, the temperature is increased to 60° C. in the course of 20 minutes. The temperature is kept at 60° C. for a further 35 minutes. Thereafter the goods are rinsed, soaped at the boil for a quarter of an hour with a nonionic detergent, rinsed again and dried.

Dyeing Instructions III 8 parts of the reactive dye obtained according to Example 10 are dissolved in 400 parts of water; 1400 parts of a solution which comprises 100 g of sodium sulfate per liter are added. 100 parts of a cotton fabric are introduced into this dyebath at 25° C. After 10 minutes, 200 parts of a solution which comprises 150 g of trisodium phosphate per liter are added. Thereafter, the temperature of the dyebath is increased to 60° C. in the course of 10 minutes. The temperature is kept at 60° C. for a further 90 minutes. Thereafter the goods are rinsed, soaped at the boil for a quarter of an hour with a nonionic detergent, rinsed again and dried.

Dyeing Instructions IV 4 parts of the reactive dye obtained according to Example 6 are dissolved in 50 parts of water. 50 parts of a solution which comprises 5 g of sodium hydroxide and 20 g of calcined sodium carbonate per liter are added. A cotton fabric is padded with the resulting solution such that it increases by 70% of its weight, and is then wound onto a batching roller. The cotton fabric is kept at room temperature in this way for 3 hours. Thereafter, the dyed goods are rinsed, soaped at the boil for a quarter of an hour with a nonionic detergent, rinsed again and dried.

Dyeing Instructions V 6 parts of the reactive dye obtained according to Example 6 are dissolved in 50 parts of water. 50 parts of a solution which comprises 16 g of sodium hydroxide and 0.04 liter of water-glass (38°Bé) per liter are added. A cotton fabric is padded with the resulting solution such that it increases by 70% of its weight, and is then wound onto a batching roller. The cotton fabric is kept at room temperature in this way for 10 hours. Thereafter, the dyed goods are rinsed, soaped at the boil for a quarter of an hour with a nonionic detergent, rinsed again and dried.

Dyeing Instructions VI 2 parts of the reactive dye obtained according to Example 10 are dissolved in 100 parts of water with the addition of 0.5 part of sodium m-nitrobenzenesulfonate. A cotton fabric is impregnated with the resulting solution such that it increases by 75% of its weight, and is then dried. The fabric is then impregnated with a solution, warmed to 20° C., which comprises 4 g of sodium hydroxide and 300 g of sodium chloride per liter and squeezed off to a weight increase of 75%, and the dyeing is then steamed at 100° to 120° C. for 30 seconds, rinsed, soaped for a quarter of an hour in a 0.3% boiling solution of a nonionic detergent, rinsed and dried.

Dyeing Instructions VII 0.1 part of the dye according to Example 6 are dissolved in 200 parts of demineralized water, and 0.5 part of Glauber's salt, 0.1 part of a levelling agent and 0.5 part of sodium acetate are added. The mixture is then brought to pH 5.5 with 80% acetic acid. The dyebath is heated to 50° C. for 10 minutes, and 10 parts of a woollen fabric are then added. The bath is heated to 100° C. in the course of about 50 minutes and dyeing is carried out at this temperature for 60 minutes. Thereafter, the bath is allowed to cool to 90° C. and the dyed goods are removed. The woollen fabric is rinsed with hot and cold water, subsequently spun and dried. A brilliant dyeing which has very good light and wet fastness properties is obtained.

Printing Instructions I 3 parts of the reactive dye obtained according to Example 6 are sprinkled, with rapid stirring, into 100 parts of a stock thickener comprising 50 parts of 5% sodium alginate thickener, 27.8 parts of water, 20 parts of urea, 1 part of sodium m-nitrobenzenesulfonate and 1.2 parts of sodium bicarbonate. A cotton fabric is printed with the printing paste thus obtained and dried and the resulting printed material is steamed in saturated steam at 102° C. for 2 minutes. The printed fabric is then rinsed, if appropriate soaped at the boil and rinsed again, and then dried.

Printing Instructions II 5 parts of the reactive dye obtained according to Example 6 are sprinkled, with rapid stirring, into 100 parts of a stock thickener comprising 50 parts of 5% sodium alginate thickener, 36.5 parts of water, 10 parts of urea, 1 part of sodium m-nitrobenzenesulfonate and 2.5 parts of sodium bicarbonate. A cotton fabric is printed with the printing paste thus obtained, the stability of which meets industrial requirements, and dried and the resulting printed material is steamed in saturated steam at 102° C. for 8 minutes. The printed fabric is then rinsed, if appropriate soaped at the boil and rinsed again, and then dried.

What is claimed is:

1. A compound of the formula

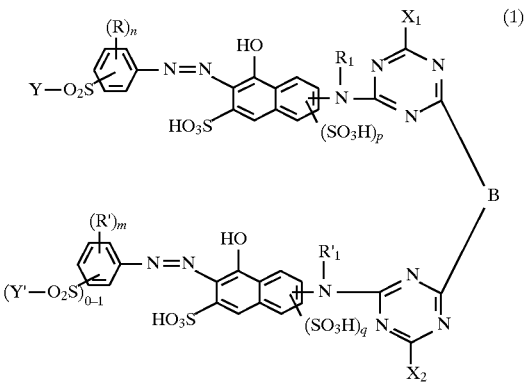

in which B is a bridge member of the formula

—NR$_2$—(alk)—NR$_3$— (2a)

or

—NR$_2$—(alk'—O)$_r$—(alk')—NR$_2$'— (2b)

or $$\underset{-NR_2-(alk)-NR'_2-,}{\overset{OR_4}{|}} \quad (2c)$$

(R)$_n$ is n identical or different radicals from the group consisting of C$_1$–C$_4$alkyl, C$_1$–C$_4$alkoxy, halogen and sulfo and (R')$_m$ is m identical or different radicals from the group consisting of C$_1$–C$_4$alkyl, C$_1$–C$_4$alkoxy, halogen and sulfo, n and m independently of one another are each the number 0, 1 or 2, R$_1$, R$_1$', R$_2$ and R$_2$' independently of one another are each hydrogen or substituted or unsubstituted C$_1$–C$_4$alkyl, R$_3$ is C$_1$–C$_6$alkyl which is substituted by hydroxyl, R$_4$ is hydrogen or C$_1$–C$_4$alkyl, (alk) is straight-chain or branched C$_2$–C$_{12}$alkylene and (alk') is straight-chain or branched C$_2$–C$_4$alkylene, X$_1$ and X$_2$ independently of one another are each halogen, 3-carboxypyridin-1-yl or 3-carbamoylpyridin-1-yl, Y and Y' independently of one another are each vinyl or a radical —CH$_2$—CH$_2$—U and U is a leaving group, and p and q independently of one another are each the number 0 or 1 and r is the number 1, 2 or 3.

2. A compound according to claim 1, in which (R)$_n$ and (R')$_m$ independently of one another are each 0, 1 or 2 identical or different radicals from the group consisting of methyl, methoxy and sulfo.

3. A compound according to claim 1, in which

X$_1$ and X$_2$ are identical and are each chlorine or fluorine.

4. A compound according to claim 1, in which

R$_1$ and R$_1$' are identical and are each hydrogen or C$_1$–C$_4$alkyl.

5. A compound according to claim 1, in which p and q are each the number 1.

6. A compound according to claim 1, in which

X$_1$ and X$_2$ are identical and are each chlorine,

R$_1$ and R$_1$' are identical and are each hydrogen, methyl or ethyl, (R)$_n$ and (R')$_m$ are identical and are each 0, 1 or 2 identical or different radicals from the group consisting of methyl, methoxy and sulfo, Y and Y' are identical and are each vinyl or β-sulfatoethyl and p and q are each the number 1.

7. A compound according to claim 1, in which

B is a radical of the formulae (2a), (2b) or (2c) defined in claim 1, in which (alk) is straight-chain or branched C$_2$–C$_6$alkylene, (alk') is 1,2-ethylene, r is the number 2 or 3, R$_2$ and R$_2$' are each hydrogen, R$_3$ is monohydroxy-substituted C$_1$–C$_4$alkyl and R$_4$ is hydrogen.

8. A compound according to claim 1, in which

B is a radical of the formula (2a).

9. A compound according claim 1, in which

B is a radical of the formula (2a) defined in claim 1, in which

R$_2$ is hydrogen, (alk) is straight-chain or branched C$_2$–C$_4$alkylene and

R$_3$ is monohydroxy-substituted C$_1$–C$_4$alkyl.

10. A compound according to claim 1, of the formula

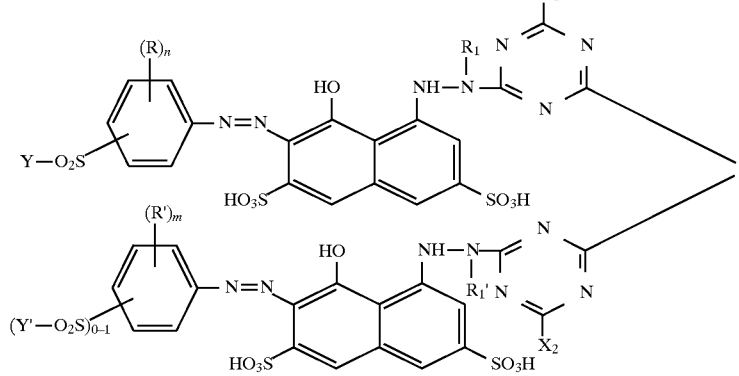

in which X$_1$ and X$_2$ are identical and are each chlorine,

R$_1$ and R$_1$' are each hydrogen, (R)$_n$ and (R')$_m$ are identical and are each 0, 1 or 2 identical or different radicals from the group consisting of methyl, methoxy and sulfo, Y and Y' are identical and are each vinyl or β-sulfatoethyl and B is a radical of the formula —NR$_2$—(alk)—NR$_3$— (2a)

in which R$_2$ is hydrogen, (alk) is straight-chain or branched C$_2$–C$_4$alkylene and R$_3$ is monohydroxy-substituted C$_1$–C$_4$alkyl.

11. A compound according to claim 10, in which

B is the radical —NH—CH$_2$CH$_2$—N(CH$_2$CH$_2$OH)—.

12. A process for the preparation of a compound of the formula (1) according to claim 1, which comprises reacting in each case about 1 molar equivalent of a compound of the formula

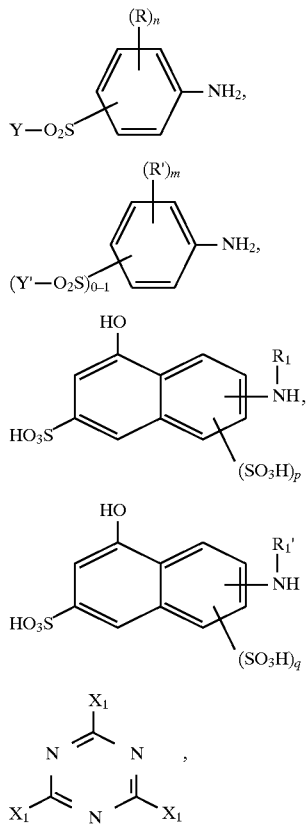

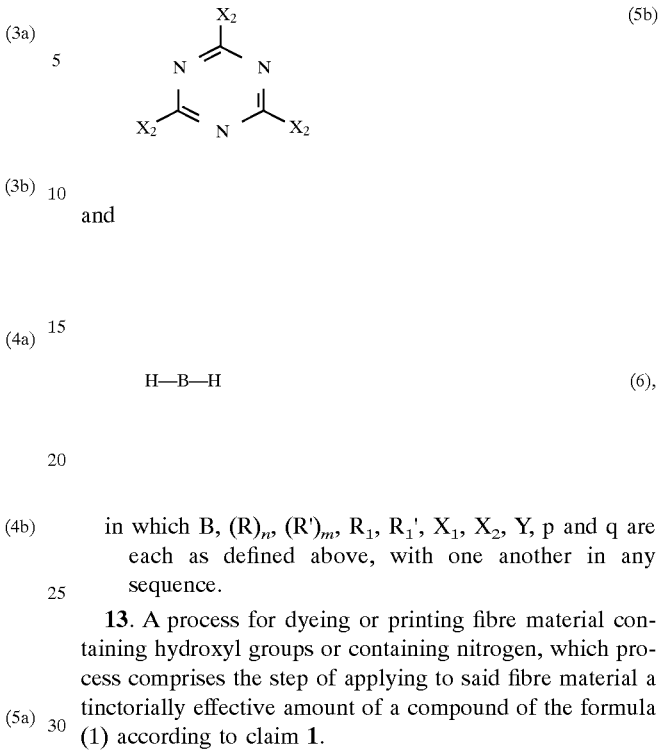

in which B, $(R)_n$, $(R')_m$, $R_1$, $R_1'$, $X_1$, $X_2$, Y, p and q are each as defined above, with one another in any sequence.

13. A process for dyeing or printing fibre material containing hydroxyl groups or containing nitrogen, which process comprises the step of applying to said fibre material a tinctorially effective amount of a compound of the formula (1) according to claim 1.

14. A process according to claim 13, wherein said fibre material is cellulosic fibre material.

* * * * *

UNITED STATES PATENT AND TRADEMARK OFFICE
CERTIFICATE OF CORRECTION

PATENT NO. : 5,831,038
DATED : NOVEMBER 3, 1998
INVENTOR(S) : HANS REICHERT

It is certified that error appears in the above-identified patent and that said Letters Patent is hereby corrected as shown below:

On the cover page, Section [54] and in column 1, lines 1-3, the title should read : -- DIAZO 20 HALOGENOTRIAZINYL GROUP-CONTAINING FIBER REACTIVE DYES, THEIR PREPARATION AND THEIR USE --.

Signed and Sealed this

Fourth Day of May, 1999

Attest:

Q. TODD DICKINSON

Attesting Officer

Acting Commissioner of Patents and Trademarks